United States Patent [19]
Crescentini

[11] Patent Number: 6,038,704
[45] Date of Patent: Mar. 21, 2000

[54] HELMET WITH OPAQUE INNER LAYER, TRANSLUCENT OUTER LAYER, AND PATTERNING THEREBETWEEN

[76] Inventor: Lynda N. Crescentini, 27316 Black Hawk Dr., Wesley Chapel, Fla. 34249

[21] Appl. No.: 09/067,234

[22] Filed: Apr. 27, 1998

Related U.S. Application Data

[63] Continuation of application No. 08/692,010, Aug. 2, 1996.
[51] Int. Cl.⁷ ............................................. A42B 3/00
[52] U.S. Cl. ........................................ 2/410; 2/412; 2/425
[58] Field of Search ............................... 2/410, 244, 412, 2/5, 6.1, 6.6, 425

[56] References Cited

U.S. PATENT DOCUMENTS

| | | | |
|---|---|---|---|
| Re. 29,742 | 8/1978 | Tung | 2/412 |
| 4,008,949 | 2/1977 | Luna | 2/410 |
| 5,525,290 | 6/1996 | Carpenter | 2/425 |
| 5,794,271 | 8/1998 | Hastings | 2/412 |

*Primary Examiner*—Diana Oleksa
*Attorney, Agent, or Firm*—Charles A. McClure

[57] ABSTRACT

Protective composite headgear bearing distinctive embedded marking, such as alphanumeric data, color patterns, or stylized designs. A patterned sheet is formed into headgear shape, and the patterned side is covered with solidifiable plastic composition. The outer layer of the resulting composite headgear is translucent, and the inner layer preferably opaque, so that the pattern between layers is protected from abrasion damage while readily visible to an onlooker. Distortion of the pattern by the shaping of the original flat sheet is counteracted by pre-distorting the sheet oppositely to offset it.

10 Claims, 6 Drawing Sheets

HELMET WITH OPAQUE INNER LAYER, TRANSLUCENT OUTER LAYER, AND PATTERNING THEREBETWEEN

This application is in substantial part a continuation of my pending application Ser. No. 08/692,010, filed Aug. 2, 1996.

TECHNICAL FIELD

This invention relates to protective headgear bearing embedded distinguishable marking, such as alphanumeric data, color patterns, and stylized designs, for ready identification to headgear viewers.

BACKGROUND OF THE INVENTION

Nearly everyone must be aware that various kinds of people wear protective headgear, examples being bicycle and motorcycle riders, construction workers, firemen, mine workers, players of so-called contact sports, race drivers, soldiers, and members of other groups, identifiable by their type of clothing or markings attached thereto.

A disadvantage of much headgear marking is lack of permanence, inasmuch as the wearers' own activities often tend to fade, degrade, or remove the identifying markings, partially if not completely.

Attempts have been made from time to time to ameliorate—if not to eliminate entirely—such degradation of headgear marking, and to encourage improved design, manufacture, and marking of the headgear. Examples identified in U.S. patents include multilayered headgear by Cleveland, U.S. Pat. No. 3,437,631; Rodell, U.S. Pat. No. 3,445,680; Gesselin, U.S. Pat. No. 4,466,138; Tung, U.S. Pat. No. 3,885,246; Johnson, U.S. Pat. No. 3,946,441; Luna U.S. Pat. No. 4,008,949; Mitchell, U.S. Pat. No. 4,599,752; and Gentes, U.S. Pat. No. 4,993,082. Johnson, Rodell, and Mitchell disclose two-piece separable headgear; Gesselin teaches an inseparable two-piece; Cleveland teaches pigmentation of headgear compositions; Tung, Luna, and Gentes illustrate layering of reflective materials in headgear.

Despite improvements contributed by those inventors or others, headgear tends to carry no marking, or only relatively uninformative all-over marking, or informative marking susceptible to damage/loss.

SUMMARY OF THE INVENTION

A primary object of the present invention is to provide protective headgear, distinctive by bearing customized alphanumeric and/or design marking, made up of informative and/or decorative patterning.

Another object of this invention is to embed a distinguishable marking into the headgear so that even substantial surface damage to the headgear will be unlikely to impair such marking.

A further object of the invention is to distinguish wearers of headgear, as by company affiliations, sports teams, and/or emergency crews, for example, clearly enough to avoid mistaking members of one such group for members of another such group, or even to distinguish each member from every other member of the same group.

Yet another object of this invention is to attain the foregoing objects without sacrificing, or while actually enhancing, safety or security aspects provided by such protective headgear.

A still further object of the invention is to accomplish the foregoing objects with little or no increase in cost, or with actual reduction in headgear costs.

In general, the objects of the present invention are attained, in composite protective headgear, by first providing a thin sheet of durable plastic composition carrying at one of its faces (perhaps impregnated with) decorative and preferably informative visible patterning, forming such sheet into headgear shape, and covering a face of the formed sheet with a preferably thicker layer of solidifiable plastic composition, solidifying that composition in place, and thus forming a more durable composite headgear structure, with patterning visible through an overlying translucent layer to outside observers.

More particularly, converting the patterned sheet into headgear shape is preferably accomplished by thermoforming, and the covering of one of its faces with the thick solidifiable layer preferably is accomplished by injection molding. Alternatively, the components might be layered together and then be formed into headgear shape in a single step, as by suitable molding, perhaps not so practicable in the present state of the art—although it might become preferable.

If the patterned sheet is to be at the outside of the headgear (as is acceptable for all except the roughest environments), the sheet is desirably translucent and carries the patterning on its concave face, to be covered by the solidifiable plastic composition, which is opaque (preferably white) to set off the pattern visually.

If the headgear is to be subjected to excessive abrasion, the patterned sheet is preferably located at the inside of the headgear, is preferably opaque, with patterning on—possibly impregnating—its own convex surface, and the solidifiable outside layer is desirably translucent to render the patterning visible to an outside observer.

A headgear of this invention is characterizable as a unitary laminate, having been formed into generally hemispherical headgear shape, and including distinctive patterning readily visible to those exterior observers viewing its convex outer surface.

Preferably, such distinctive patterning is intentionally distorted initially (when flat), to become substantially undistorted to a viewer in its resulting generally hemispherical headgear shape.

Other objects of this invention, together with means and methods for attaining the various objects, will become apparent from the following description and the accompanying diagrams presented by way of example rather than limitation of embodiments of this invention.

SUMMARY OF THE DRAWINGS

FIG. 6 is an elevation of the shaped headgear of FIG. 4 or 5, before trimming away of flashing, showing a resulting undistorted grid pattern appearing distorted only by being viewed straight on;

DESCRIPTION OF THE INVENTION

Figure 1:
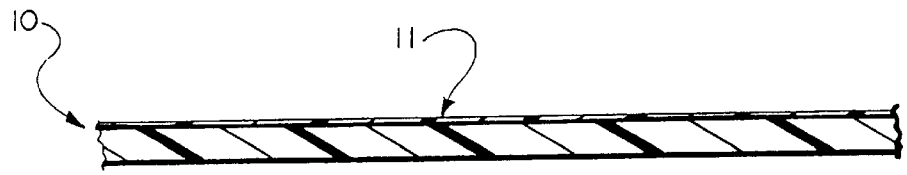
FIG. 1 is a sectional elevation of a sheet of durable plastic material of this invention, patterned along one face only.

FIG. 1 shows, in sectional elevation (thickness exaggerated), sheet 10 of durable plastic material of this invention having, along one of its opposite faces only, distinctive intermittent pattern 11, optionally impregnating the face to a limited depth.

Figure 2:
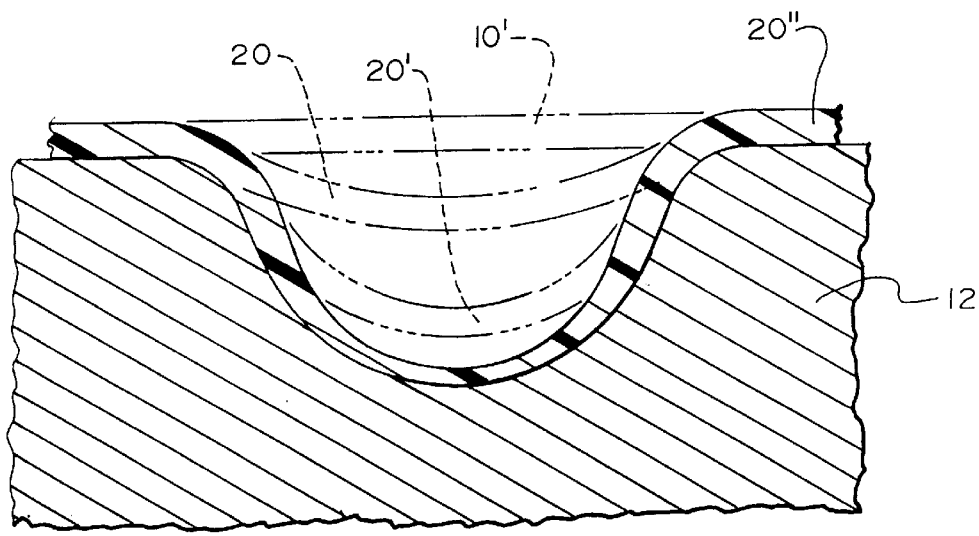
FIG. 2 is a series of side sectional elevations of the sheet of FIG. 1 being formed into substantially hemispherical configuration in a female mold preparatory to having its patterned face covered.

FIG. 2 shows, in side sectional elevation, thermo-forming female mold 12, bridged (in phantom) by successive positions of flat starting sheet 10', its subsequent first central sagging configuration 20, its further sagging intermediate configuration 20', and (in solid section) substantially semicircular final cut of its resulting configuration 20"—getting progressively thinner at their midpoints.

Figure 3:
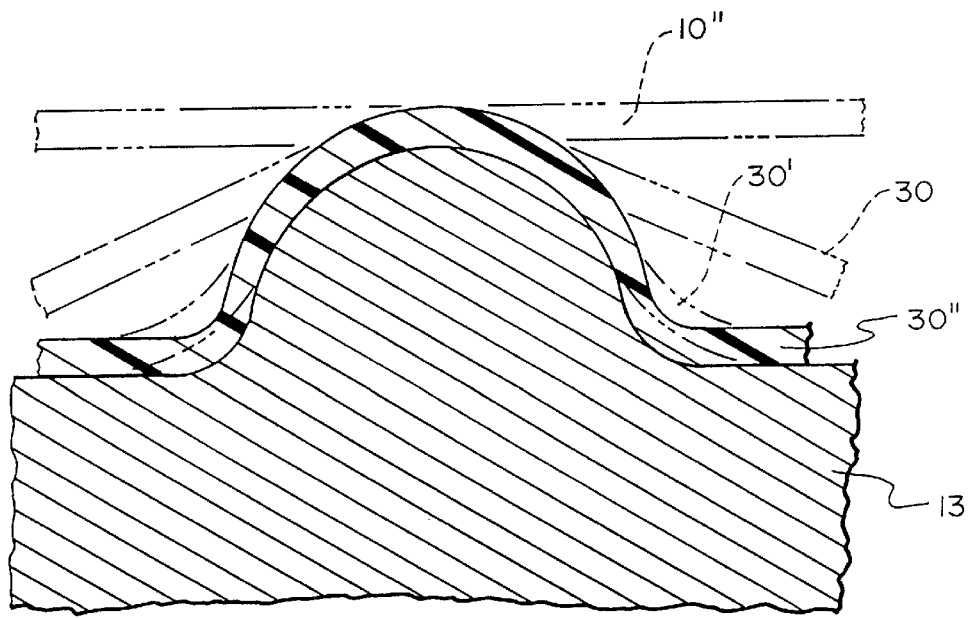
FIG. 3 is a series of side sectional elevations of the sheet of FIG. 1 being formed into substantially hemispherical configuration on a male mold preparatory to having its patterned face covered.

FIG. 3 shows, in side sectional elevation, male mold 13, bridged similarly by flat starting sheet 10", subsequent first peripheral sagging configuration 30, intermediate further sagging configuration 30', and (in solid section) final substantially semicircular final cut of its resulting upright hat-like hemispherical configuration 30". Each section is somewhat thinner at its junction to the remaining flat peripheral part than its last predecessor was.

In both FIGS. 2 and 3, most of the remaining flat (unshaped) portions constitute flashing that eventually is removed by stamping or a similar operation, leaving the headgear-shaped body portion.

Figure 4A:
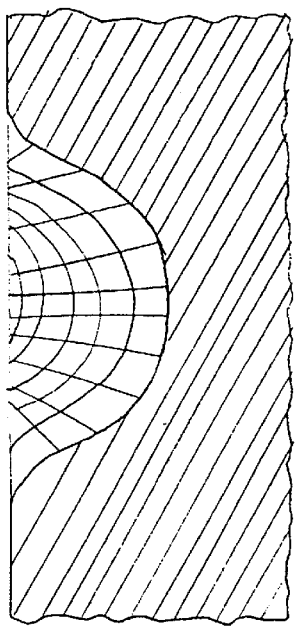
FIGS. 4A and 4B are side sectional views of a uniformly grid-patterned sheet formed as in FIG. 2 and representing, respectively, the normally resulting distorted pattern appearance, and a preferred pre-distorted pattern to compensate for shaping-induced distortion.
Figure 4B:
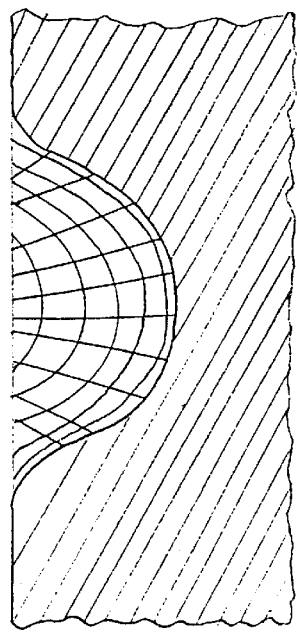

FIGS. 4A and 4B show side sectional views of a uniformly grid-patterned sheet formed as in FIG. 2 and representing, respectively, the normally resulting distorted pattern appearance, and a preferred pre-distorted pattern to compensate for shaping-induced distortion; Thus, if the starting sheet has a uniform grid pattern, the forming of that sheet will distort the pattern as shown in FIG. 4A, wherein the originally parallel central portions of the grid become spaced too wide apart, as shown in FIG. 4A, and decrease progressively in spacing when further from the center. In order to produce a uniform grid (or other pattern) in a resulting headgear shape, an oppositely pre-distorted starting pattern should be used, as shown in FIG. 4B.

In FIGS. 4A, 4B, 5A, 5B, grid crowding and curving attributable to surface non-perpendicularity to the line of sight are minimized, to emphasize stretching of the grid attributable to sheet thinning.

Figure 5A:
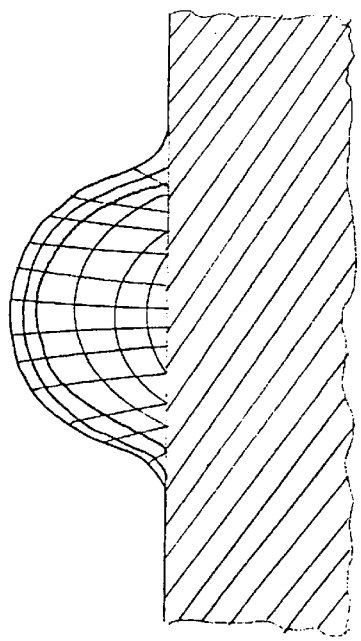
FIGS. 5A and 5B are side sectional views of a uniformly grid-patterned sheet formed as in FIG. 3 and representing, respectively, the normally resulting distorted pattern appearance, and a preferred pre-distorted pattern to compensate for shaping-induced distortion.
Figure 5B:
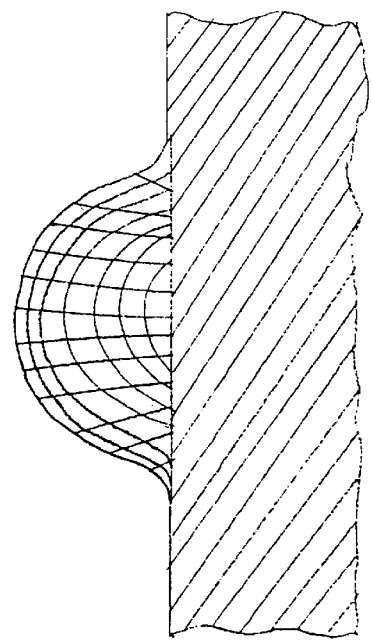

FIGS. 5A and 5B show side sectional views of a uniformly grid-patterned sheet formed as in FIG. 3 and representing, respectively, the normally resulting distorted pattern appearance, and a preferred pre-distorted pattern to compensate for shaping-induced distortion; Thus, such forming will result in the distorted pattern of FIG. 5A, wherein the grid lines become spaced further apart along a ringlike locus of bending at the crown level. Such a localized distortion becomes progressively less at both greater and lesser distances from that ringlike crown locus. Hence, to reproduce a uniform grid in a resulting headgear shape, an oppositely distorted starting pattern, such as shown in FIG. 5B is preferably employed in this invention.

As explained below, pattern distortion from forming the flat sheet into generally hemispherical headgear shape is pre-calculated to counteract unevenness of forming the sheet including the pattern, so the pattern on the resulting headgear is as regular as desired. Of course, if somewhat ellipsoidal or ovoidal headgear is to result, distortion relative to the conventional planar (x,y) axes of the sheet (not so marked) in FIGS. 4A and 4B, and in FIGS. 5A and 5B, will be unequal proportionately along the respective axes to apportion (or to compensate for) the desired degree(s) of eccentricity.

Figure 6:
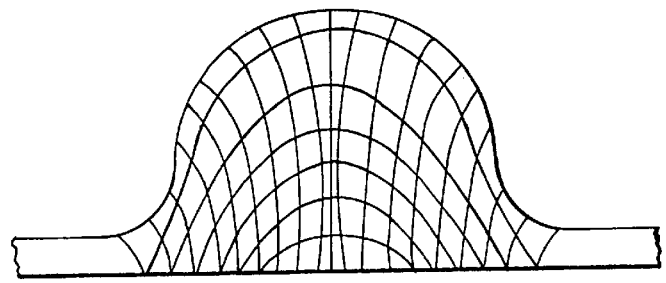

FIG. 6 shows, in elevation, the headgear of either FIG. 4 or 5, with the resulting pattern substantially undistorted. The apparent distortion is essentially uniform in any elevational view for hemispherical headgear, and is usually correctly interpreted visually. A slightly ellipsoidal or ovoidal headgear would be closely similar. The grid-free edge portions are flashing remnants to be trimmed off.

Figure 7A:
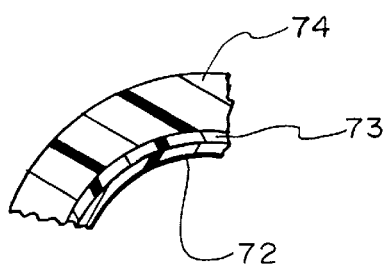
FIG. 7A is a thickness cross-section view of relatively heavy-duty headgear, patterned nearer its inner than its outer surface.
Figure 7B:
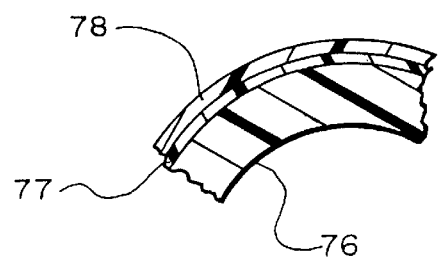
FIG. 7B is a thickness cross-section view, of relatively light-duty headgear, patterned nearer its outer than its inner surface.

FIGS. 7A and 7B are fragmentary thickness sections of resulting headgear in which relative positions of a thin patterned sheet and a thick impact-resistant solidified layer are interchanged between the concave inner surface and the convex outer surface of the headgear.

FIG. 7A shows fragmentarily a thickness section of heavy-duty headgear of this invention, with thick impact-resistant layer 74 at convex outer surface of the headgear, thin layer 72 as its concave inside face and carrying patterning 73 between the two layers and preferably opaque if impregnating by the patterning itself.

FIG. 7B shows a similar section of light-duty headgear having thin translucent layer 78 forming its convex outside face, carrying patterning 77 at (not impregnating) its concave inner surface, which adjoins the convex surface of preferably opaque thick layer 76.

The terms "light-duty" and "heavy-duty" in this description are exemplary rather than limitative, because both composition and thickness contribute to durability, so various trade-offs are possible.

The patterning feature of this invention is ignored in all the rest of the illustrative views, which are directed to conventional protective headgear features, except that the final block diagram, which recapitulates steps and apparatus of the present invention.

Figure 8:
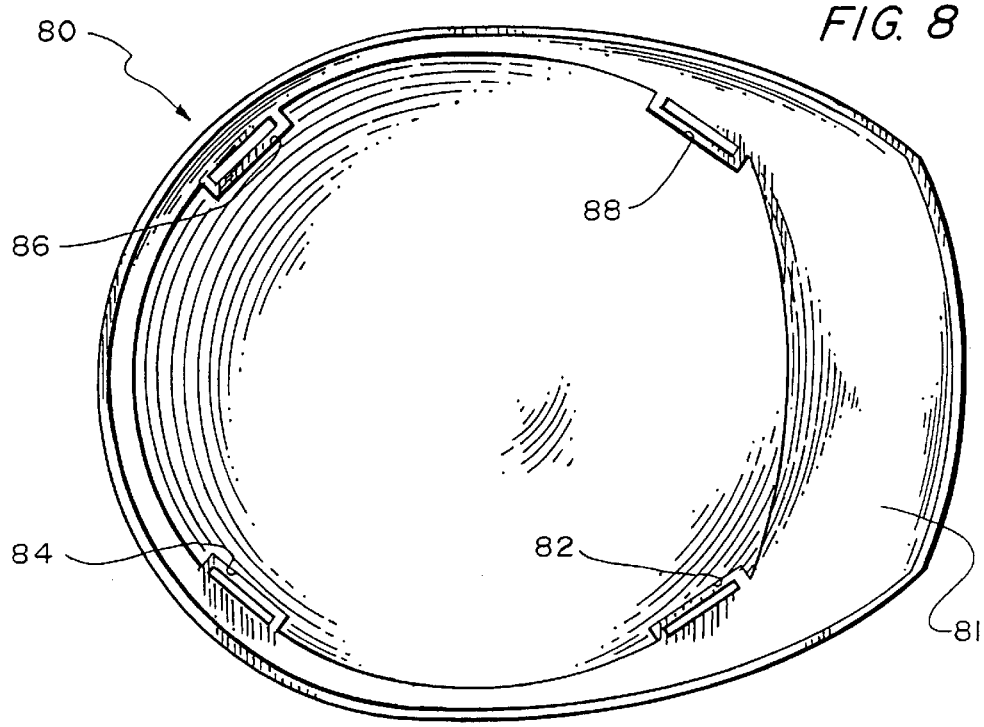
FIG. 8 is a bottom plan of the headgear of this invention with harness or suspension recesses on its inner surface.

FIG. 8 shows, in bottom plan, headgear 80 of this invention, featuring bill 81 extending to the right (forward, on a fore-to-aft axis) and recesses 82, 84, 86, and 88 for fasteners of a suspension harness on its inner surface, evenly spaced at the bisectors of each quadrant. The generally hemispherical shape of the headgear is apparent in this view from the even circular spacing of the recesses. Each recess is adapted to receive and removably retain a conventional fastener (not shown here) when inserted thereinto.

Figure 9:
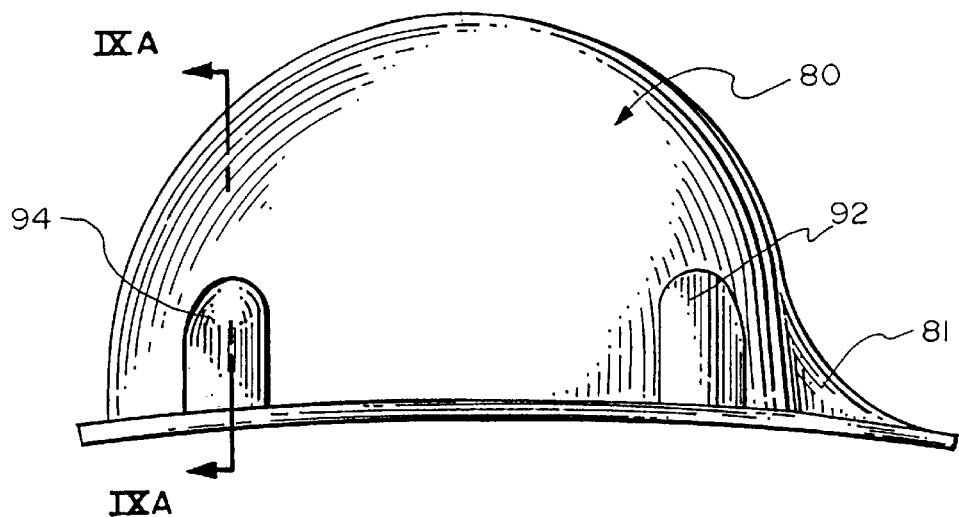
FIG. 9 is a side elevation of the headgear of FIG. 8 (pattern omitted) with outside bosses corresponding to the inside recesses.

FIG. 9 shows, in fragmentary side elevation, the same headgear having visible external bosses 92, 94, corresponding to internal recesses 82, 84 of the previous view.

Figure 9A:
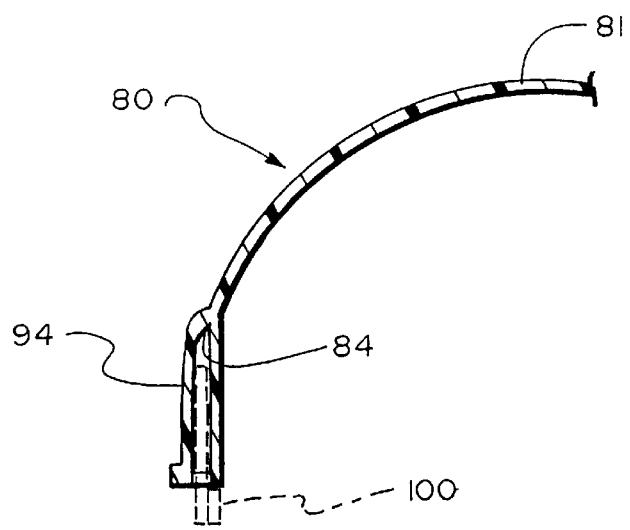
FIG. 9A is a fragmentary section through the headgear of FIG. 9 taken at IXA—IXA on FIG. 9.

FIG. 9A shows fragmentarily a sectional elevation through boss 94 over recess 84 of the same headgear, with the headgear cross-section shown as single plastic layer 81 more nearly in scale than in the views where component layers of the composite were visible.

Figure 10A:
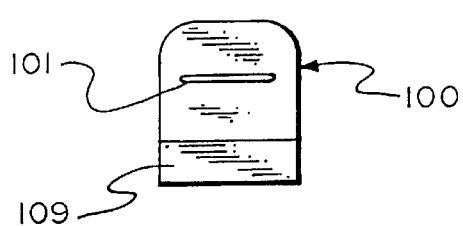
FIGS. 10A and 10B are, respectively, a face elevation and a side elevation of a fastener to fit into a fastener-receiving recess in the headgear of FIG. 8.
Figure 10B:
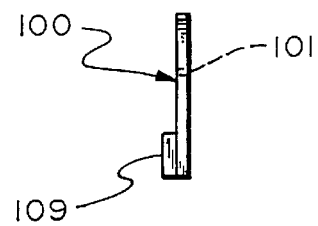

FIGS. 10A and 10B show conventional fastener 100 in elevation face-on and edgewise, respectively. The fastener is generally rectangular with rounded corners at one end to facilitate insertion, with slot 101 adapted to receive and retain an individual strap of a suspension harness, and with enlargement along its opposite end to provide a grip to facilitate its removal.

Figure 11A:
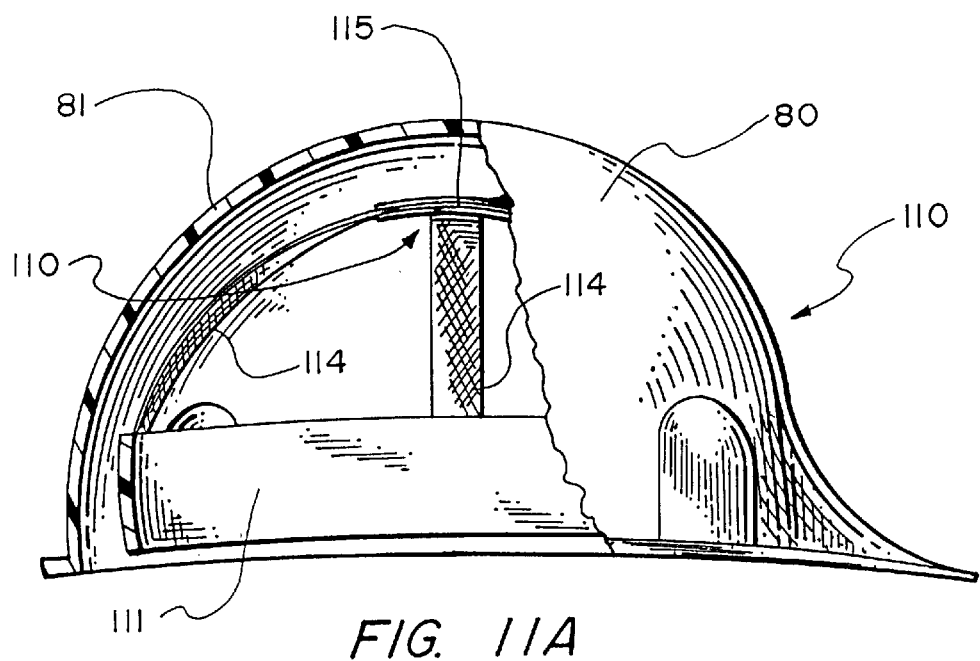
FIGS. 11A and 11B are partial medial sectional elevations fore-to-aft through the headgear of FIG. 8, with suspension harness and foamed liner, respectively, installed in the headgear interior.

FIG. 11A shows, in partial cutaway fore-to-aft medial sectional elevation, assembly 110 comprising headgear 80 of this invention, with its composite shell 81 shown simplified, and with suspension harness 110 including encircling headband 111, head cap 115, and interconnecting straps 110. Thus, the headgear is spaced away from the head, as is customary for improved ventilation and enhanced safety in the event of headgear impact.

Figure 11B:
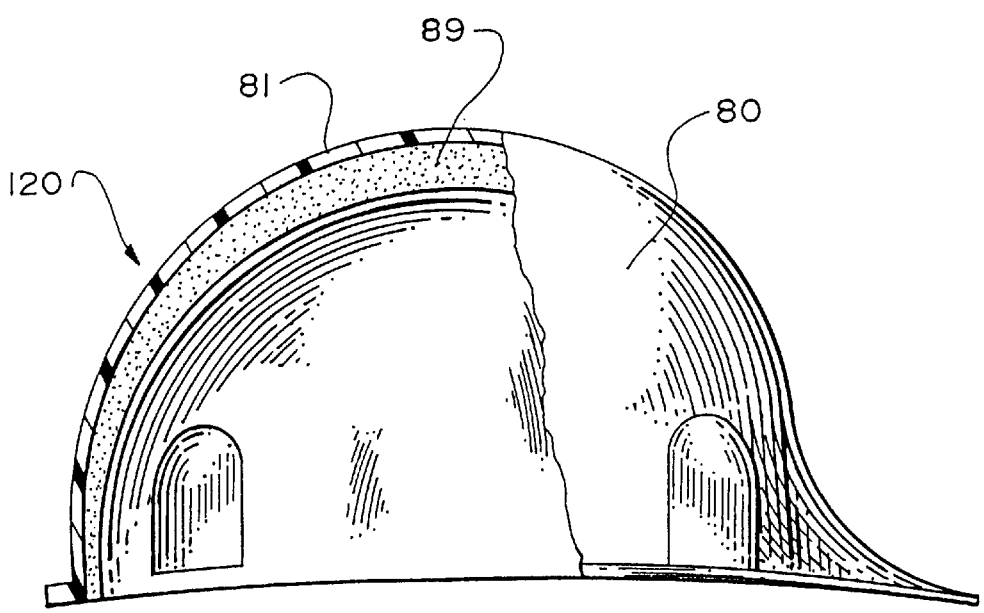

FIG. 11B shows, in a similar view of assembly 120, comprising headgear 80 with simplified showing of its shell 81, and with solid foam liner 89 installed along the inside surface thereof, thicker overhead and progressively thinner down the sidewall. The liner is secured adhesively or by other bonding with the inside wall.

If desired, both the FIG. 11A and the FIG. 11B additions may be combined to provide a solid foam liner and a suspension harness, and any of the assemblies may be provided with a conventional chin strap (not shown here) retained by a clip to the headgear or otherwise.

Figure 12:
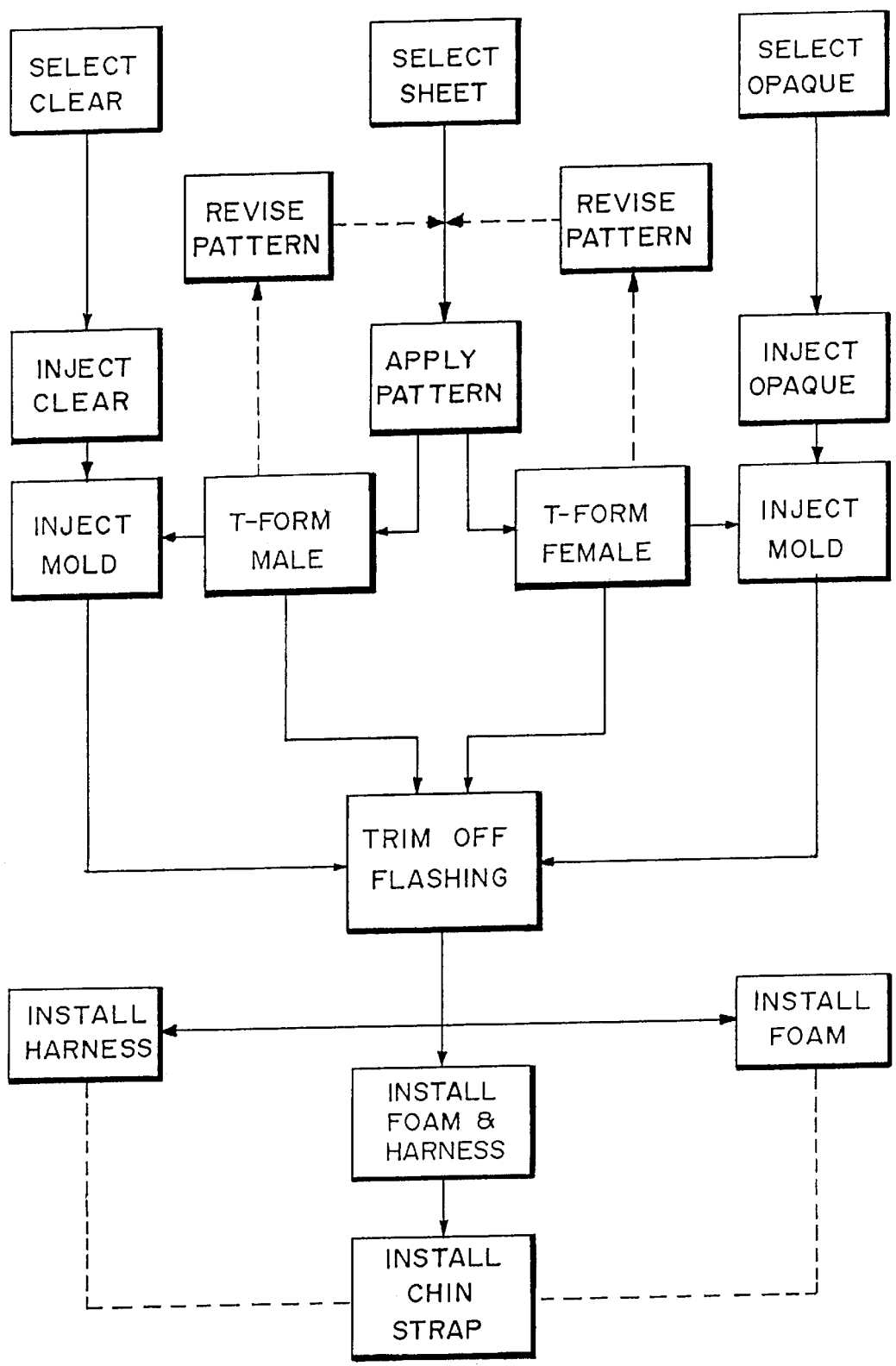
FIG. 12 is a block diagram of the processing of the starting materials into the headgear of this invention.

FIG. 12 is a block diagram of the processing of the starting materials into headgear of this invention. The following description of this view supplements the description of the preceding drawings and will explain further how to make this very distinctive headgear. Reference numerals are omitted from this description as superfluous.

The step SELECT SHEET (top center) is followed by APPLY PATTERN (as by silk screening or surface impregnation of the thin sheet). Next, the patterned sheet passes either to T-FORM MALE or to T-FORM FEMALE as in FIGS. 3 and 2, respectively, for corresponding thermoforming. If the resulting pattern is unsatisfactory the article can be sent as a guide to a REVISE PATTERN step. (If intended only as a toy or for visual display, the article can go to TRIM OFF FLASHING.) Normally though, the patterned surface of the intermediate thermoformed article is usually covered with solidifiable plastic in the INJECT MOLD step. When the T-FORM MALE intermediate product is selected, it receives clear plastic from the INJECT CLEAR step following the SELECT CLEAR step at the upper left. Otherwise, the T-FORM FEMALE intermediate product receives opaque plastic from the INJECT OPAQUE step following the SELECT OPAQUE step (upper right). The product from either mold goes to TRIM OFF FLASHING, completing formation of the headgear shell.

Additional steps are shown for both a hard hat type of protective headgear, at the left, as INSTALL HARNESS and optional (broken line) INSTALL CHIN STRAP; and for a sports helmet the INSTALL FOAM solid pad step followed by the INSTALL CHIN STRAP step. Alternatively both the solid foam and the suspension harness may be installed, with or without chin strap.

Optionally T-FORM and/or INJECT MOLD step(s) may be modified or be replaced by equivalent forming steps, or a single composite step, such as an all-injection (or equivalent) technique, while retaining all or some of the advantages and benefits of the present invention.

The headgear of this invention (excluding foamed padding, etc.) may measure as little as several mm. or about one-eighth inch thick, the patterned sheet being about a tenth of such thickness, or about a dozen mils; alternatively up to as much as about twice that thick.

The compositions and other materials for practicing the present invention are all readily available through normal trade channels. Besides some already mentioned, the Cleveland patent discloses other, potentially useful polymeric compositions for the starting sheet. Cleveland also discloses inorganic pigments, organic pigments, and inorganic salts of organic pigments useful for patterns as herein.

My preferred headgear compositions include alkylenes, such as high-density polyethylene (HDPE), polycarbonates, such as GE's LEXAN® brand thereof, also acrylonitrile-butadiene-styrenes (ABS) or polyvinyl chlorides (PVC). Whichever is/are chosen should meet or exceed impact-resistance and also electrical resistance requirements for protective headgear. Ridges and like structural reinforcement can be built into the headgear of this invention—but they are not structurally necessary, as all strength requirements are met anyway.

The desired patterning can be accomplished in a number of ways. My preference, when the sheet is to remain translucent, is to print the distinctive design on the sheet, which can be done well enough by conventional silk screening with thermally stable inks.

A desirable alternative is sublimation printing, where the inks impregnate the sheet (usually not translucent) to a depth of several mils. As thermo-forming heats the sheet anyway, the printing step can just precede the thermo-forming (or perhaps even be combined). Suitable sublimation inks are well known, such as disclosed in U.S. Pat, Nos. 4,042,545; 5,250,494; 5,270,284; 5,382,561; and 5,391,536. Also see U.S. Pat. No. 5,311,816 for more about sublimation printing.

Thermo-forming and injection molding are conventional processes that are so well known as not to need any further commentary here, notwithstanding that individual processors may have preferred ways of operating, not necessarily generally known in their trade.

Another embodiment of this invention enables distinctive foreground pattern and a partial or an all-over background pattern, such as marbling or stippling, or reflective microbeads, or a diamond or similar geometric pattern, to be superimposed on a single sheet, or on separate sheets juxtaposed before or during thermo-forming.

The durability of the headgear of this invention reduces the overall cost of maintaining a presentable appearance, not only for the user's own satisfaction but also for the public impression that it makes, as is especially important when protective headgear is mandated as part of a uniform or other attire in business or industry, sports or entertainment, civic or military service, etc.

The advantages of almost indestructable distinctive patterning of protective headgear are hard to overstate, especially as compared with the faded, peeling, scratched, and otherwise degraded indicia on many a sports team's helmets or a construction crew's hardhats. Not only can a team or corporate affiliation be readily indicated, as on the side or front of the headgear, but an individual's name, number, rank, etc. can be shown on the side or back, for example.

Preferred embodiments and variants have been suggested for this invention. Other modifications may be made, as by adding, combining, deleting, or subdividing compositions, parts, or steps, while retaining all or some of the advantages and benefits of the present invention—which itself is defined in the following claims.

The invention claimed is:

1. Composite protective headgear, comprising essentially a translucent exterior abrasion-resistant solid plastic layer, an opaque interior solid plastic layer, and intermediate patterning sandwiched therebetween visible to an onlooker viewing it from the exterior.

2. Protective headgear of generally hemispherical shape and composite laminar structure, comprising an outer layer of durable translucent thermoplastic material, an inner layer of durable opaque thermoplastic material, intervening patterning on one of the aforesaid layers, the patterning being visible to an external observer viewing it through the translucent outer layer and thus against the opaque inner layer.

3. Headgear according to claim 2, plus spacing means therein adapted to space the concave surface of the headgear away from the head of a person wearing the headgear.

4. Headgear according to claim 3, wherein the spacing means includes suspension material detachably attached to the headgear.

5. Method of making protective headgear, comprising the following steps:

forming an opaque sheet of durable plastic composition into a generally hemispherical headgear configuration;

forming a translucent sheet of durable plastic composition into a like hemispherical headgear configuration adjacent the exterior of the opaque sheet;

including an intermediate step of providing laminar patterning therebetween, initially associated more closely with one such sheet than with the other such sheet; and solidifying the respective sheets into composite headgear configuration with the patterning visible to outside viewers of it.

6. Method according to claim 5, including a preliminary step of providing the opaque sheet with such patterning on the face thereof at the outside of its hemispherical configuration.

7. Method according to claim 5, including a preliminary step of providing the translucent sheet with such patterning on the face thereof at the inside of its hemispherical configuration.

8. Method according to claim 5, further including a preliminary step of providing a distorted configuration of said patterning, when viewed flat on one of said sheets, prior to forming said one of said sheets into said generally hemispherical configuration, said distorted configuration of said pattern being adapted to become undistorted when said one of said sheets is formed into said hemispherical headgear configuration.

9. Patterned generally hemispherical headgear produced by the method of claim 5.

10. Patterned generally hemispherical headgear produced by the method of claims 5 and 8.

* * * * *